Jan. 5, 1926.
W. E. URSCHEL
1,568,700
APPARATUS AND PROCESS FOR STEMMING FRUIT
Filed April 22, 1925   4 Sheets-Sheet 3
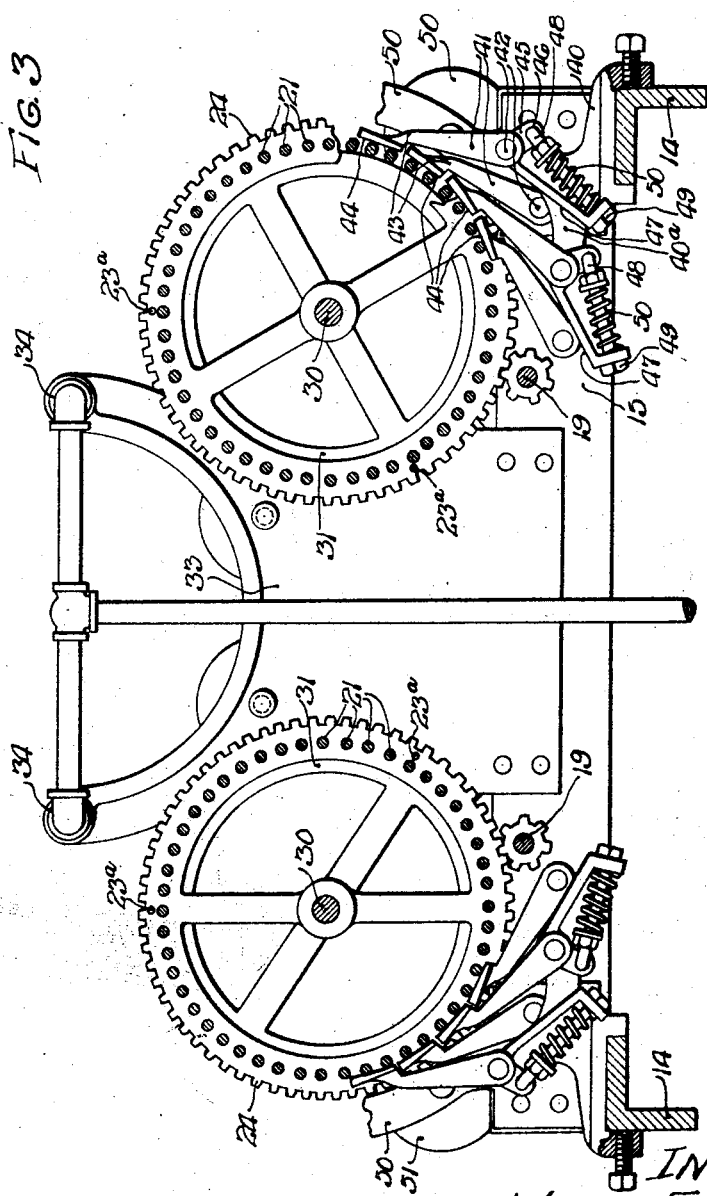
INVENTOR:
WILLIAM E. URSCHEL
By
ATTY.

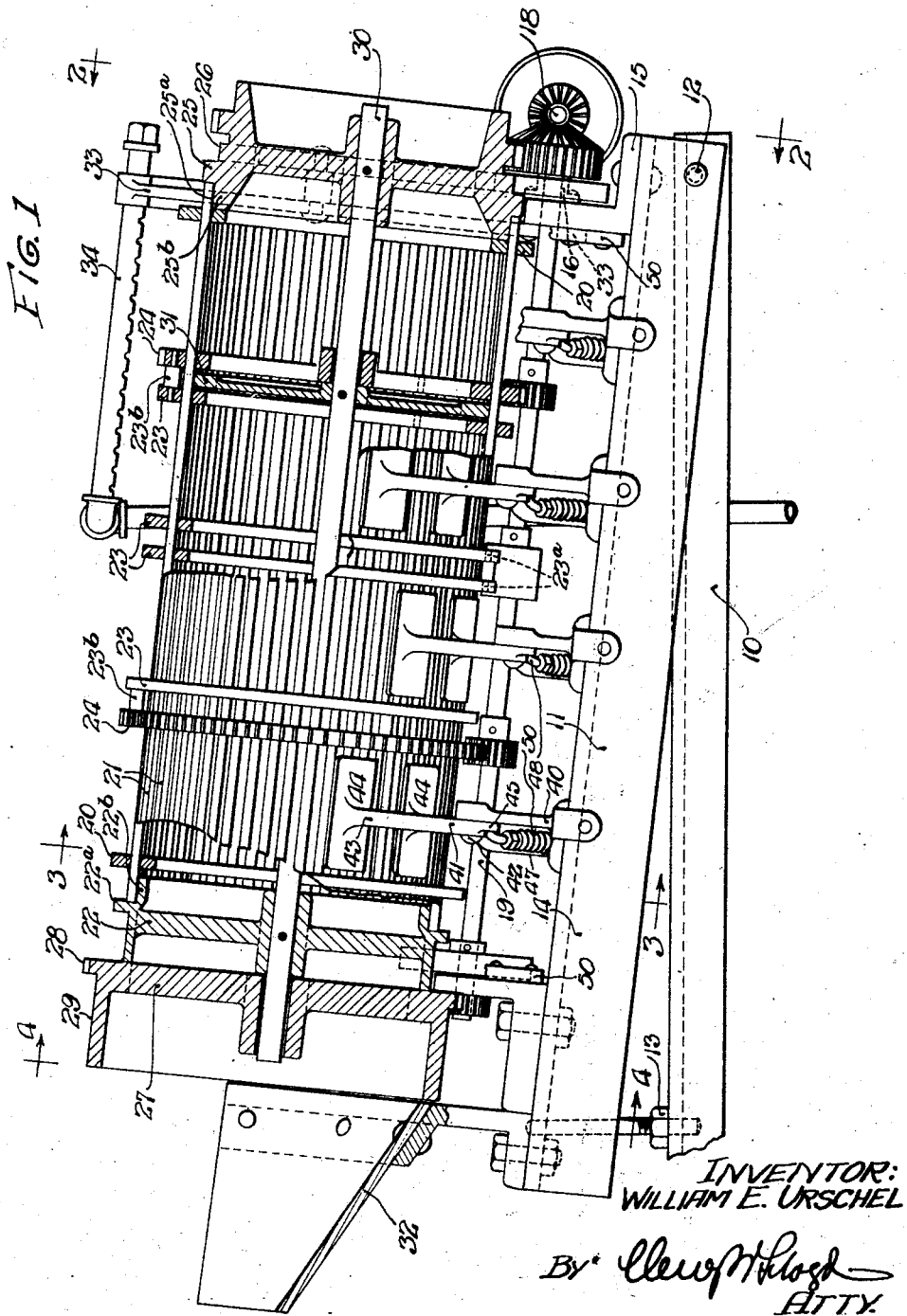

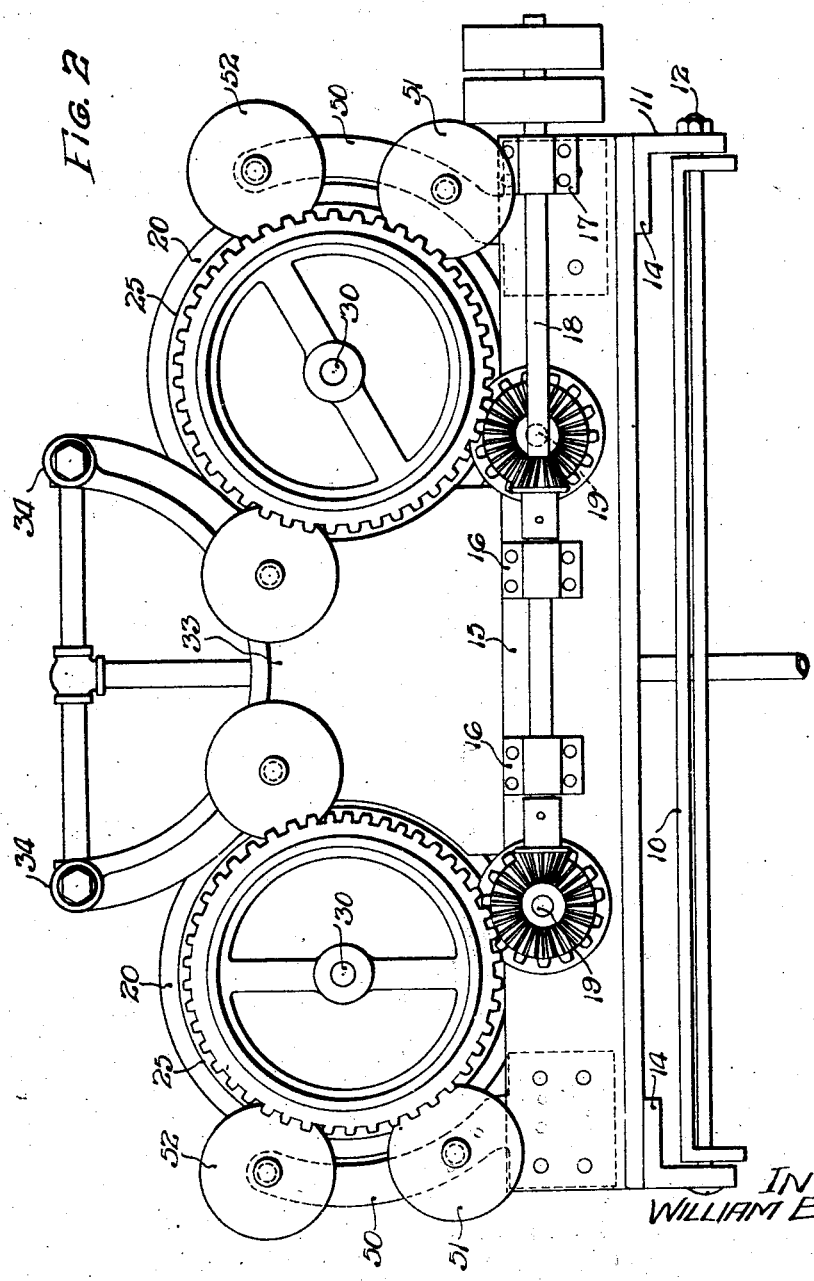

Jan. 5, 1926.  1,568,700
W. E. URSCHEL
APPARATUS AND PROCESS FOR STEMMING FRUIT
Filed April 22, 1925  4 Sheets—Sheet 4

INVENTOR:
WILLIAM E. URSCHEL

ATTY.

Patented Jan. 5, 1926.

1,568,700

UNITED STATES PATENT OFFICE.

WILLIAM E. URSCHEL, OF VALPARAISO, INDIANA.

APPARATUS AND PROCESS FOR STEMMING FRUIT.

Application filed April 22, 1925. Serial No. 25,028.

*To all whom it may concern:*

Be it known that I, WILLIAM E. URSCHEL, a citizen of the United States, residing at 158 South Napoleon Street, Valparaiso, in the county of Porter and State of Indiana, have invented a new and useful Improvement in Apparatus and Processes for Stemming Fruit, of which the following is a specification.

The present invention relates to an apparatus for stemming fruit and also to the process which is employed therein in separating stems from fruit.

Among the objects of the invention are the following:—

A novel improvement in roller bearing stemming apparatus which permits of washing fruit while contained therein;

A roller bearing stemming device comprising a rotating cylinder having means upon the outside of such cylinder for grasping fruit stems, such fruit grasping means being the sole means on the exterior of the cylinder for rotating the rollers;

Better means for gearing of the fruit carrying cylinder in order that the rollers therein can not travel faster at one end than at the other whereby binding of such rollers is avoided;

An improved device for holding a fruit stem puller block against cylinder rollers, including means for releasing stems collecting between the block and rollers; and A unique apparatus and process for ridding fruits of their stems, the apparatus including means for causing stems to protrude from a ribbed cylinder, apparatus for drawing stems from the fruit, means for keeping the rollers in said cylinder from binding, and means for releasing removed stems from the stem pulling parts.

These, and such other objects as may hereinafter appear, are obtained by the novel construction, combination, and arrangement of the several elements which constitute the invention, one embodiment of which is illustrated in the accompanying drawings.

In said drawings:—

Figure 1 is a side elevation of a device embodying the invention, various parts being broken away to show details of construction;

Figure 2 is an elevation on the line 2—2 at one end of Figure 1 looking in the direction of the arrows;

Figure 3 is a transverse section of a portion of the opposite end of the device taken on the line 3—3 of Figure 1 and looking in the direction of the arrows;

Figure 4 is a transverse section through the cages on the line 4—4 of Figure 1;

Figure 5 is a detail, in elevation, showing the construction of the stem gripping members and adjacent parts.

Like reference characters are used to designate similar parts in the drawing and in the description which follows.

In actual practice of the invention, the device is adapted to be mounted upon any suitable platform or stand, but preferably is disposed on a stand 10 comprising a frame or base 11, pivoted at one end 12 of such stand 10, and having an adjustable tilting screw 13 at the other end. In constructing such a base or frame 11 and assembling it with platform or stand 10, any suitable means other than that illustrated may be employed, for permitting tilting of the device without disturbing the operable relation of the driving gears connected therewith. In the illustrated embodiment of the device, the frame 11 comprises side and end bar members 14 and 15, respectively. Side members 14 are suitably pivoted at 12 to base 10 as hereinabove indicated.

One of end members 15 carries two or more brackets 16 and 17 in which a driving shaft 18 is journalled; said shaft 18 having pulley and belt connection with a suitable prime mover (not shown).

Parallel to sides 14, two shafts 19 are journalled in end members 15. Said shafts 19 are suitably geared to shaft 18. Each of shafts 19 carries a plurality of gears for purposes hereinafter to be described.

The whole of the moving parts of the device are disposed upon frame 11 and is driven by the gears on shafts 19. Fruit stemming is accomplished in two rotating baskets 20 arranged in parallel relation upon said frame 11.

Said parallel baskets, cages or ribbed barrels 20 contain the fruit during the entire time it is being stemmed. Each of said barrles 20 comprises, preferably, a plurality of rollers and the necessary supports therefor.

In the drawings, rollers 21 of barrels 20 are journalled in spaced relation in a plurality of annular members. Such annular members include a number of roller supports 23 and annular gears 24, and said annular members are arranged in pairs, either two supports 23 are joined by pins 23ª or a support 23 and a gear 24 are joined by spaced pins 23ᵇ.

At the front end of barrel 20 and exterior thereto is an annular front member 22 adapted to be served as a collar keeping rollers 21 from longitudinal movement, the flange 22ª providing a stop for said rollers 21. A similar member 25 is disposed at the rear end of the device. The flange thereon is indicated by the reference character 25ª, and in each instance, these members have an annular flanged section 22ᵇ and 25ᵇ adapted to engage rollers 21 from the inside of barrel 20. Member 25 carries a gear wheel 26, and is internally supplied with spokes and a hub within which latter member is disposed a shaft 30 adapted to rotate therewith. Shaft 30 extends through the center of barrel 20, but not in engagement therewith, floating at its front end where it is secured to flanged member 22 and carries at spaced intervals between members 22 and 25, a plurality of wheels 31 adapted to engage the rollers 21 forming the shell of barrel 20 just as the members 22ᵇ and 25ᵇ do. At the front of the device is a rotating chute 27 called the feed member, having a gear 28, such chute 27 having a peripheral flange 29 extending forwardly.

Through the gears upon shafts 19 which engage the gears 24 of barrel 20, the gear 25ᵇ of end member 25, and the gear 28 of chute 27, barrels 20 are made to rotate in opposite directions while end members 27 and 25 and shaft 30 are caused to rotate in the same direction as the cylinders 20 within which such shaft 30 is contained, the speed of rotation of wheels 31 and end members 22 and 25 being about one half of that of cylinders 20, thereby producing a relatively slow rotary movement for the rollers 21. Hopper 27 rotates different sections.

At the front end of cylinders 20, stationary hoppers 32 are secured to end member 15, and are movable conjointly therewith so that fruit deposited therein is fed by gravity into cylinder 20. By the rotary movement of said cylinder 20 and because of its tilted position, such fruit is caused to slowly travel toward the rear of cylinder 20 from which it is finally discharged when the fruit is deprived of its stems.

Adjacent the rear of the frame 11 is a bracket 33 from which project adjustable sprinkler pipes 34 adapted to direct a flow of water or other cleansing solution onto the fruit contained in cylinders 20. Suitable conduit connections to a source of supply are provided for pipes 34.

Upon each of the side members 14, a plurality of stem gripping devices are disposed. Such devices comprise a bracket 40 detachably secured to a side member 14 having an integral arm 40ª, one or more pivoted levers on said arm 40ª, and a spring actuating each of said levers. Each of brackets 40 in the present device includes two arms to which levers 41 are pivoted at 42. More arms could be provided. At the upper and longer end 43 of each of said levers 41 is a flat plate 44 which may have a rubber or other gripping face, such plate 44 having an oblique or inclined surface adapted to engage from the outside, one or two at a time, rollers 21 upon cylinder 20 as said cylinder is rotated. Levers 41 are arranged so that the plates 44 are in staggered relation, and are variously disposed upon the exterior of cylinder 20.

The lower and shorter ends of levers 41 comprise a short section 45 having an aperture 46 therethrough. Brackets 40 are provided with a number of flanged sections 47 corresponding to the number of levers 41 thereon and in juxtaposition to short arms 45. A bolt member 48 is suitably loosely secured to arm 45 through the agency of aperture 46. The free end of bolt 48 extends through an aperture in flange 47 and is provided with a nut 49 for limiting inward movement of face 44 and preventing disassembly of parts. A spiral spring 50 is coiled about bolt 48 intermediate an adjusting nut thereon and the adjacent flange 47. Arm 43 is urged by spring 50 into impinging engagement with rollers 21 by the pressure or tension thereof on the adjusting nut upon bolt 48 secured to shorter arm 45.

Fruit, such as cherries and the like, having somewhat elongated stems, are deposited in the hopper 32. The said hopper 32 is so disposed that it empties in the rotating annular member 26 and from thence, by force of gravity aided by the rotary movement of said members 22 and 27, the fruit passes into the cylinder 20. In the cylinder 20, the fruit is continually agitated by the rotating movement of the cylinder and by the rotation of the rollers 21. In the course of travel from one end of cylinder 20 to the other end thereof the projecting stems of the cherries or other fruit will fall between the bars 21 and will be gripped by one of the face plates 44.

Further rotation of the cylinder 20 causes the stems of the cherries or other fruit to be gripped between stationary face plate 44 and the rotatable bar 21. As the space between bars 21 is such that the cherry or other fruit may not be drawn therethrough, and the stem of the cherry is firmly held between bar 21 and face plate 44, the cherry will be carried with the cylinder 20, leaving behind the stem. The slow rotation of the bars 21 will eventually loosen or disengage the stem from face plate 44.

Should there be an excess number of stems gathered between the cylinder rollers 21 and face plate 44, the tension of the spring 50 will become weaker and the stems will fall out. This is because the lever 41 as forced away from rollers 21 approaches a dead center, such dead center being approached as stems collect upon the face 44.

Various means may be devised to maintain the cylinder 20 in position upon the frame of the device but a plurality of rollers on brackets as shown in Figure 2 is the preferred mechanism. To the side members 11, two or more brackets 50 are secured. Adjacent the lower end of said brackets 50 are rollers 51 and at the upper end thereof are other rollers 52. Rollers 51 and 52 engage rolls 21 in cage 20. The cage 20 is thus held freely rotatable and against accidental displacement.

I claim:—

1. In a fruit stemmer, a movable perforate member having openings permitting of fruit stems projecting therethrough, a member mounted against rotation adapted to engage fruit stems projecting through said openings in said member, and means for causing fruit to move upon said perforate member.

2. A fruit stemmer comprising a rotatable perforate member comprising a plurality of spaced rollers, means for rotating said member, means for causing said fruit to travel from one end of said member to the other end, and means for washing fruit contained in said rotatable member.

3. In a fruit stemmer, a rotating barrel comprising a plurality of rollers, means for holding said rollers journalled in spaced relation, and means for washing fruit contained in said barrel and as an incident to travel therethrough.

4. In a fruit stemmer, a rotatable cylinder comprising a plurality of rollers adapted to be rotated, means for rotating said cylinder, means within said cylinder whereby rotative movement is imparted to said rollers, and a spring actuated member mounted against rotation disposed externally to said cylinder and adapted to co-operate with said rollers whereby to detach stems projecting between said rollers from fruit.

5. In a fruit stemmer, a rotating cylindrical basket comprising a plurality of rollers, means for rotating said basket and said rollers, and against rotation on the outside of said basket for grasping fruit stems projecting through said rollers, said member being the only means external to said basket adapted to cause said rollers to rotate.

6. In a fruit stemmer, a rotatable cylinder comprising a plurality of rollers adapted to be rotated, means for rotating said cylinder, a plurality of spaced members within said cylinder rotating at a speed different from said cylinder and frictionally engaging said rollers whereby rotary movement is imparted thereto, and members mounted against rotation external to said cylinder and adapted to grasp fruit stems projecting through said rollers, said members being the only elements external to said cylinder adapted to rotate said rollers.

7. In a fruit stemmer, a rotating cylinder comprising a plurality of rollers, spacing collars and gears adapted to journal said rollers, said gears being spaced apart and driven at the same speed, whereby said cylinder is rotated at the same speed at both ends, and means for actuating said gears.

8. In a fruit stemmer, a rotatable cylinder comprising a plurality of rollers adapted to be rotated within spacing collars, means for rotating said cylinder, and the spring actuated member mounted against rotation external to said cylinder and adapted to be urged against said rollers to detach stems from fruit, said member when moved away from said cylinder by an accumulation of fruit stems being adapted to lose a portion of the force causing it to impinge said rollers.

9. In a fruit stemmer, a rotating cylinder comprising a plurality of rollers and spacing collars and a member mounted journalling said rollers, against rotation external to said cylinder and adapted to detach fruit stems through the openings in said cylinder, said member being urged into contact with said cylinder by a spring member, so disposed that the impinging force of said spring is reduced as an incident to forcing said member away from said cylinder.

10. In a fruit stemmer, a rotatable barrel comprising gear members, rollers adapted to be rotated within gear members, means for rotating said cylinder at a uniform speed at opposite ends, a plurality of spaced members within said cylinder rotating at a speed different from said cylinder and frictionally engaging said rollers whereby rotary movement is imparted thereto, and a spring actuated member external to said cylinder mounted against rotation and adapted to co-operate with said rollers to detach stems from fruit, the urging force of said spring being reduced as stems accumulate between said cylinder and said member.

11. In a fruit stemmer, a rotating cylinder comprising a plurality of rollers journalled in gears and spacing collars, against rotation adapted to detach fruit stems through the openings between said rollers, said rollers being driven by a plurality of internal friction rollers driven at a speed different from the rotation of said cylinder.

12. In a fruit stemmer, a rotatable cylinder comprising a plurality of rollers adapted to be rotated within spacing collars, means for rotating said cylinder, members within said cylinder rotating at a speed different from said cylinder and frictionally engaging said rollers whereby rotary movement is imparted thereto, and a spring actuated member mounted against rotation external to said cylinder and adapted to co-operate with said rollers to detach stems from fruit, said member being the only member external to said cylinder adapted to cause rotation of said rollers.

13. In a fruit stemmer, a rotating cylinder comprising annular gears, spacing members, and rollers journalled in said gears and spacing members, means for rotating said cylinder, members in said cylinder rotating at a speed different from said cylinder and frictionally engaging said rollers, and a spring actuated pivoted member adapted to co-operate with said rollers to grasp stems of fruit projecting between said rollers.

14. In a fruit stemmer, a tiltable frame, a rotatable cylinder comprising a plurality of rollers adapted to be rotated within spacing collars mounted on said frame, means for rotating said cylinder, a plurality of spaced members within said cylinder rotating at a speed different from said cylinder and frictionally engaging said rollers whereby rotary movement is imparted thereto, and a plurality of detachable members mounted on said frame external to said cylinder and adapted to co-operate with said rollers to detach stems from fruit.

WILLIAM E. URSCHEL.